(12) United States Patent
Kim et al.

(10) Patent No.: US 10,201,019 B2
(45) Date of Patent: Feb. 5, 2019

(54) METHOD AND APPARATUS FOR ACCESSING BROADBAND CHANNEL IN WIRELESS LAN SYSTEM

(71) Applicant: LG ELECTRONICS INC., Seoul (KR)

(72) Inventors: Jeongki Kim, Seoul (KR); Kiseon Ryu, Seoul (KR); Giwon Park, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

(21) Appl. No.: 15/325,427

(22) PCT Filed: Jul. 6, 2015

(86) PCT No.: PCT/KR2015/006961
§ 371 (c)(1),
(2) Date: Jan. 10, 2017

(87) PCT Pub. No.: WO2016/006898
PCT Pub. Date: Jan. 14, 2016

(65) Prior Publication Data
US 2017/0164409 A1 Jun. 8, 2017

Related U.S. Application Data

(60) Provisional application No. 62/022,670, filed on Jul. 10, 2014, provisional application No. 62/023,181, filed on Jul. 11, 2014.

(51) Int. Cl.
*H04W 74/08* (2009.01)
*H04W 72/04* (2009.01)
*H04W 84/12* (2009.01)

(52) U.S. Cl.
CPC ... *H04W 74/0833* (2013.01); *H04W 72/0446* (2013.01); *H04W 74/0825* (2013.01); *H04W 84/12* (2013.01)

(58) Field of Classification Search
CPC ......... H04W 74/0833; H04W 72/0446; H04W 84/12
(Continued)

(56) References Cited

U.S. PATENT DOCUMENTS 8,275,323 B1   9/2012   Shirali et al.
8,705,679 B1   4/2014   Venkatesh et al.
(Continued)

FOREIGN PATENT DOCUMENTS

JP   2013537783      10/2013
KR   1020030018051   3/2003
(Continued)

OTHER PUBLICATIONS

PCT International Application No. PCT/KR2015/006961, Written Opinion of the International Searching Authority dated Oct. 1, 2015, 14 pages.
(Continued)

*Primary Examiner* — Ricky Q Ngo
*Assistant Examiner* — Ellen A Kirillova
(74) *Attorney, Agent, or Firm* — Lee, Hong, Degerman, Kang & Waimey

(57) ABSTRACT

The present document relates to a backoff procedure and apparatus for efficiently accessing a broadband channel in a wireless LAN system. To this end, a station performs a clear channel assessment (CCA) operation in each of a plurality of channels, and when one or more of the plurality of channels is/are not used and the one or more channels is/are not used for frame transmission in the basic service set (BSS) of its/their station, the station is characterized in that it per-
(Continued)

forms or re-performs a backoff procedure in the one or more channels. When a backoff counter value becomes zero according to the backoff procedure, the station may transmit a frame through the one or more channels.

11 Claims, 12 Drawing Sheets

(58) Field of Classification Search
USPC .................................................. 370/329, 469
See application file for complete search history.

(56) References Cited

U.S. PATENT DOCUMENTS

| | | | |
|---|---|---|---|
| 2009/0028059 A1* | 1/2009 | Barbaresi | H04W 16/22 370/250 |
| 2010/0195664 A1 | 8/2010 | Ho | |
| 2014/0092860 A1* | 4/2014 | Kneckt | H04W 72/1205 370/329 |
| 2014/0153505 A1* | 6/2014 | Pantelidou | H04W 28/065 370/329 |
| 2014/0307650 A1* | 10/2014 | Vermani | H04L 5/0044 370/329 |
| 2015/0009907 A1* | 1/2015 | Merlin | H04W 74/0808 370/329 |

FOREIGN PATENT DOCUMENTS

| | | |
|---|---|---|
| KR | 1020100048345 | 5/2010 |
| KR | 1020130041242 | 4/2013 |
| KR | 1020130122000 | 11/2013 |
| WO | 2013122415 | 8/2013 |
| WO | 2014061992 | 4/2014 |

OTHER PUBLICATIONS

Korean Intellectual Property Office Application No. 10-2016-7036924, Notice of Allowance dated May 16, 2018, 4 pages.

* cited by examiner

METHOD AND APPARATUS FOR ACCESSING BROADBAND CHANNEL IN WIRELESS LAN SYSTEM

CROSS-REFERENCE TO RELATED APPLICATIONS

This application is the National Stage filing under 35 U.S.C. 371 of International Application No. PCT/KR2015/006961, filed Jul. 6, 2015, which claims the benefit of U.S. Provisional Application Nos. 62/022,670, filed on Jul. 10, 2014 and 62/023,181, filed on Jul. 11, 2014, the contents of which are all hereby incorporated by reference herein in their entirety.

TECHNICAL FIELD

The present invention relates to a backoff procedure for efficiently accessing a broadband channel in a Wireless Local Area Network (WLAN) system, and an apparatus therefor.

BACKGROUND ART

Standards for a Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

IEEE 802.11ac has introduced the concept of a primary/secondary channel to provide a broadband channel in the course of the WLAN standardization.

DISCLOSURE

Technical Problem

However, since Clear Channel Assessment (CCA) is performed and a Network Allocation Vector (NAV) is controlled only for a primary channel to simplify operations on the primary channel and a secondary channel, spatial efficiency is reduced.

Accordingly, an object of the present invention is to provide a backoff procedure for efficiently accessing a broadband channel in a Wireless Local Area Network (WLAN) system, and an apparatus therefor.

Technical Solution

In one aspect of the present invention, a method for transmitting a frame using a plurality of channels by a station (STA) in a wireless local area network (WLAN) system includes performing clear channel assessment (CCA) for each of the plurality of channels, if at least one of the plurality of channels is not in use and the at least one channel is not used for frame transmission within a basic service set (BSS) of the STA, proceeding or resuming a backoff procedure for the at least one channel, and if a backoff count reaches 0 in the backoff procedure, transmitting a frame on the at least one channel.

The plurality of channels may include a primary channel and at least one secondary channel, and the at least one channel for which the backoff procedure is proceeded or resumed may include the primary channel and the at least one secondary channel.

If a frame is received on a primary channel or a secondary channel among the plurality of channels, a network allocation vector (NAV) may be set or updated for each of the primary channel or the secondary channel.

If a frame is received on the secondary channel that does not overlap with the primary channel, a physical layer entity of the STA may issue a reception vector (RXVECTOR) primitive to a medium access control (MAC) layer entity, and the reception vector (RXVECTOR) primitive may include a channel list listing all of the plurality of channels.

If a primary channel among the plurality of channels is used for frame transmission of another BSS, the backoff procedure may be proceeded or resumed for at least one secondary channel among the plurality of channels.

The physical layer entity of the STA may determine whether transmission of a frame is frame transmission within the BSS of the STA by checking a HE SIG field of the frame. If the physical layer entity of the STA is not capable of determining whether the transmission of the frame is frame transmission within the BSS of the STA by checking the HE SIG field of the frame, the frame transmission may be considered to be fame transmission within the BSS of the STA.

A channel used for frame transmission during the backoff procedure, among the plurality of channels may be configured not to be used for frame transmission performed if a backoff count is 0 in the backoff procedure.

The STA may be an access point (AP) STA or a non-AP STA.

In another aspect of the present invention, an STA configured to transmit a frame using a plurality of channels in a WLAN system includes a processor configured to perform CCA for each of the plurality of channels, and if at least one of the plurality of channels is not in use and the at least one channel is not used for frame transmission within a basic service set (BSS) of the STA, to proceed or resume a backoff procedure for the at least one channel, and a transceiver connected to the processor and configured to, if a backoff count reaches 0 in the backoff procedure, transmit a frame on the at least one channel The processor may include a physical layer entity, and a MAC layer entity, and the physical layer entity of the STA may determine whether transmission of a frame is frame transmission within the BSS of the STA by checking a HE SIG field of the frame.

If a frame is received on a secondary channel that does not overlap with the primary channel, the physical layer entity of the STA may issue a reception vector (RXVECTOR) primitive to the MAC layer entity, and the reception vector (RXVECTOR) primitive may include a channel list listing all of the plurality of channels.

The STA may be an AP STA or a non-AP STA.

Advantageous Effects

According to the present invention as described above, the efficiency of wireless resources can be increased, while a broadband channel is utilized. A data transmission error can be prevented according to an embodiment.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described before, the following description is given of a method and apparatus for efficiently using a broadband channel in a Wireless Local Area Network (WLAN) system. To do so, a WLAN system to which the present invention is applied will first be described in detail.

Figure 1:
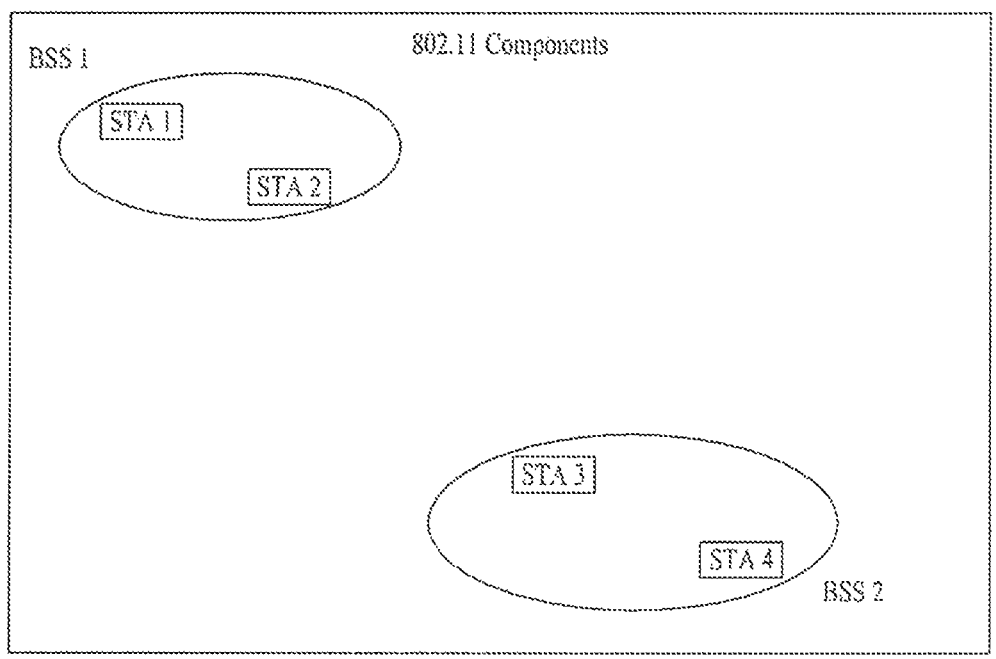
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
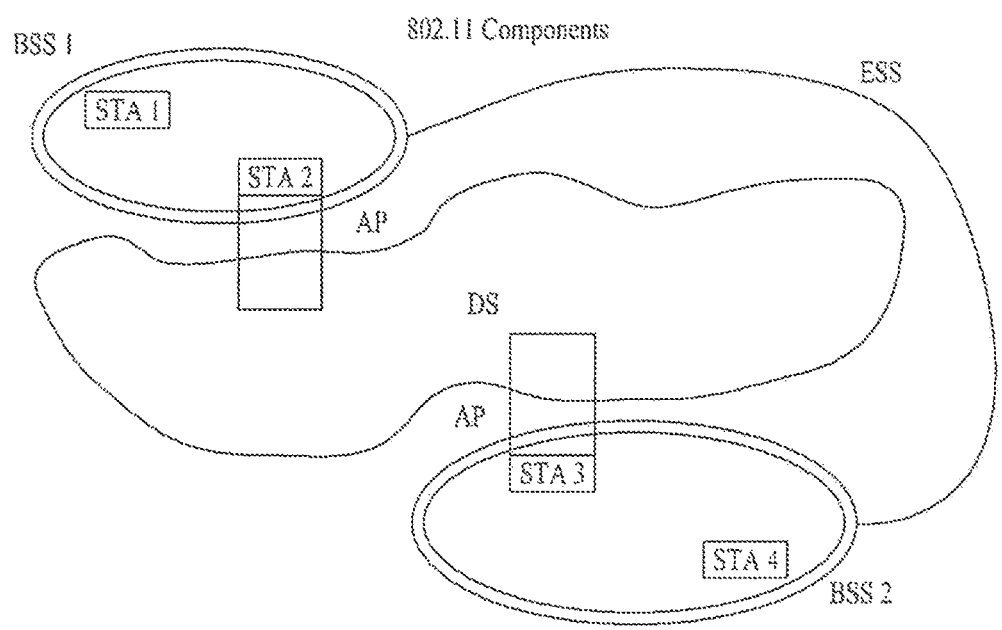
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above description, a collision detection technology of the WLAN system according to the present invention is explained hereinafter.

As mentioned in the foregoing description, a transmitting end has a difficulty in performing accurate collision detection in a wireless environment since various elements affect a channel in the wireless environment. In order to solve the problem, a DCF (distributed coordination function), which corresponds to a CSMA/CA (carrier sense multiple access/collision avoidance) mechanism, has been introduced in 802.11.

Figure 3:
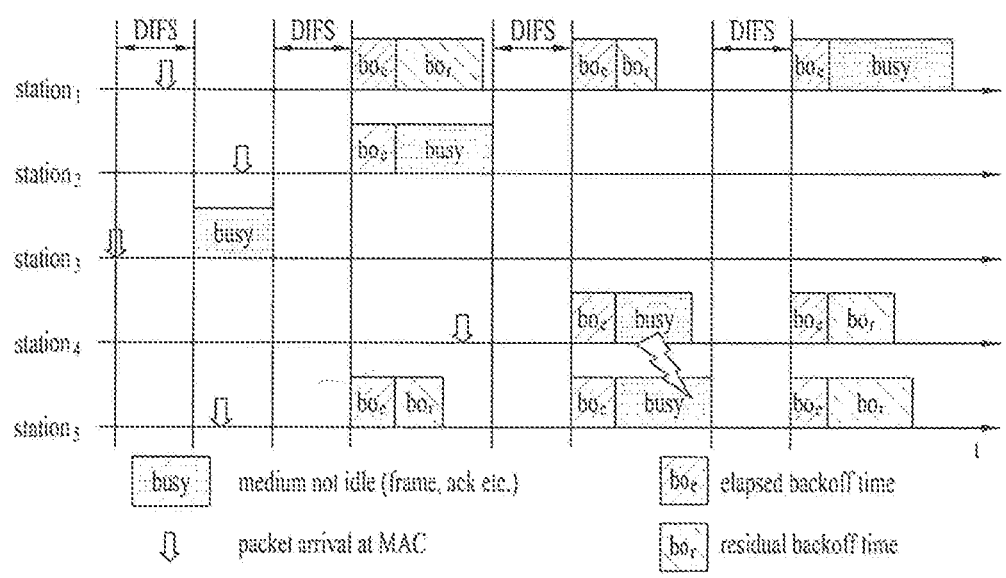
FIG. 3 is a diagram for describing a Distributed Coordination Function (DCF) mechanism in a WLAN system.

FIG. 3 is a diagram for describing the DCF mechanism in the WLAN system.

The DCF performs CCA (clear channel assessment) for sensing a medium during a specific period (e.g., DCF inter-frame space (DIFS)) before STAs having data to be transmitted transmit the data. In this case, if the medium is idle, an STA may transmit a signal using the idle medium. On the contrary, if the medium is busy, an STA may transfer data after waiting for a random backoff period in addition to the DIFS on the assumption that several STAs stand by in order to use the busy medium. In this case, the random backoff period allows STAs to avoid collisions with each other. In particular, assuming that there are a plurality of STAs that intend to transmit data, each of the STAs may have a different backoff period value stochastically. Accordingly, each of the STAs may have a different transmission time. If an STA initiates transmission using a medium, other STAs may not use the medium.

In the following description, a random backoff time and a random backoff procedure are briefly explained.

If a specific wireless medium is switched from a busy state to an idle state, a plurality of STAs start preparations for transferring data. In this case, in order to minimize collisions, each of the STAs that intend to transmit data selects a random backoff count and then stands by for a corresponding slot time. The random backoff count is a pseudo-random integer value and is determined as one of values uniformly distributed in the range of [0 CW]. The CW means a contention window.

Although a CW parameter has an initial value CWmin, this value may be doubled in case of transmission failure. For instance, when an STA fails in receiving ACK in response to a transmitted data frame, the STA may consider that a collision occurs. When a CW value reaches a maximum value CWmax, the CWmax value is maintained until data transmission is successfully performed. If the data transmission is successful, the CW value is reset to the CWmin value. In this case, for convenience of implementation and operation, it is preferable that CW, CWmin and CWmax are set to maintain $2^n-1$.

Meanwhile, if a random backoff procedure is initiated, an STA continuously monitors a medium during backoff slot countdown after selecting a random backoff count in the range of [0 CW]. During the countdown, if the medium enters a busy state, the STA stops the countdown and stands by. Thereafter, if the medium enters an idle state, the STA resumes the rest of backoff slot countdown.

Referring to FIG. 3, when there are a plurality of STAs that intend to transfer data, STA 3 transfers data immediately since a medium has been in the idle state for DIFS. However, the rest of STAs stand by until the medium enters the idle state. Since the medium has been in the busy state for a while, several STAs monitors the medium in order to use it and thus each of the STAs selects a random backoff count. FIG. 3 illustrates a case that STA 2, which selects a smallest backoff count, transmits a data frame.

After the STA 2 completes transmission, the medium is in the idle state again and then the STAs resume the stopped countdown with respect to backoff interval. In FIG. 3, having stopped the countdown for a while since the medium was in the busy state, STA 5 having a second smallest backoff count value (smaller than that of the STA 2) starts data frame transmission after performing the remaining backoff slot countdown. However, a collision occurs since it overlaps with a random backoff count value of STA 4 by chance. In this case, since both of the two STAs fail in receiving ACK response, they select random backoff count values again after doubling the CW.

As described above, the most basic of CSMA/CA is the carrier sensing. A terminal may use both physical carrier sensing and virtual carrier sensing in order to determine whether a DCF medium is in a busy state or an idle state. The physical carrier sensing is performed through energy detection or preamble detection in a physical layer (PHY). For instance, if a voltage level in a receiving end is measured or if it is determined that a preamble is read, the terminal may determine that the medium is in the busy state. The purpose of the virtual carrier sensing is to prohibit other STAs from transmitting data by setting a Network Allocation Vector (NAV) and it is performed using a value of Duration field in a MAC header. Moreover, a robust collision detect mechanism has been introduced in order to reduce collision probability. For the robust collision detect mechanism, operations using a Request To Send/Clear To Send (RTS/CTS) have been proposed.

Figure 4:
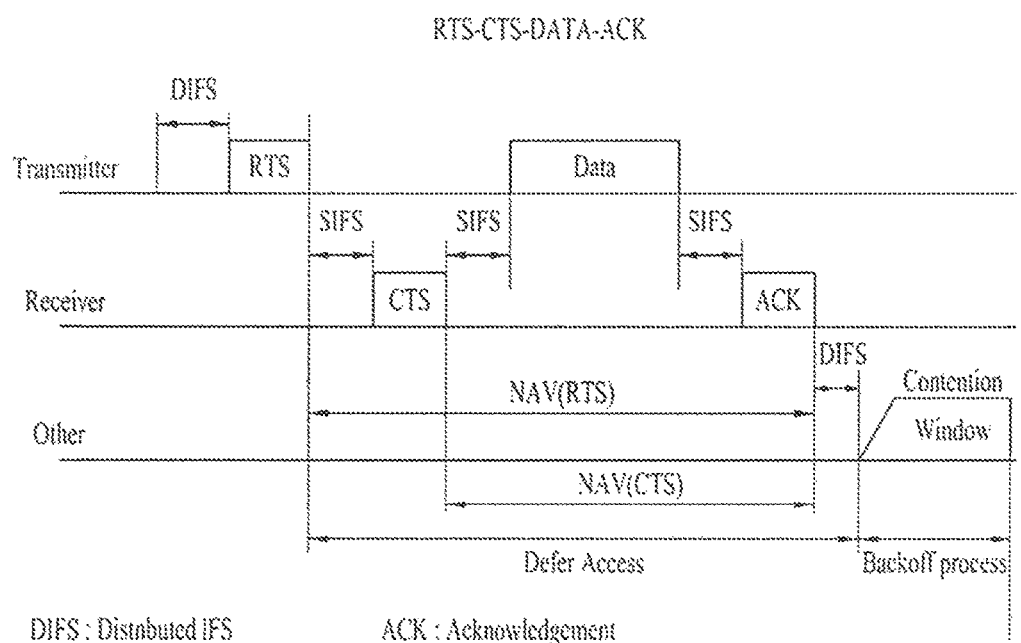
FIG. 4 is a diagram for describing details of an operating method using a Request To Send/Clear To Send (RTS/CTS) frame.

FIG. 4 is a diagram for describing details of an operating method using RTS/CTS frame.

Referring to FIG. 4, after a Distributed IFS (DIFS), a transmitting STA may transmit an RTS frame to a receiving STA to which the transmitting STA will transmit a signal. Having received the RTS frame, the receiving STA may transmit a CTS frame to the transmitting STA after a Short IFS (SIFS). After receiving the CTS frame from the receiving STA, the transmitting STA may transmit data after an SIFS as shown in FIG. 4. After receiving the data, the receiving STA may transmit an ACK response in response to the data received after an SIFS.

Meanwhile, among neighboring STAs except the above-mentioned transmitting and receiving STAs, an STA that receives an RTS/CTS of the transmitting STA may determine whether a medium is busy or not according to RTS/CTS reception, and may configure a NAV based on the medium state. If a NAV duration ends, the STA may perform the contention resolution procedure described above with reference to FIG. 3 after a DIFS.

Figure 5:
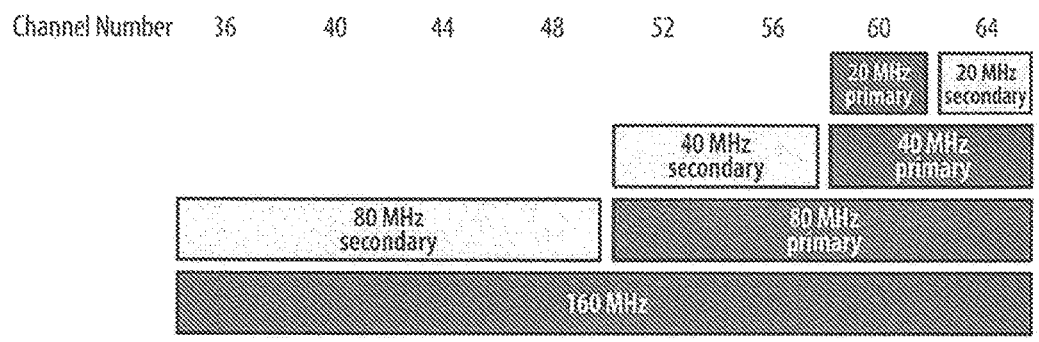
FIG. 5 is a diagram for describing the concept of a primary channel and a secondary channel.

Now, a description will be given of a problem encountered when a CCA operation and a NAV setting are confined to a primary channel FIG. 5 is a diagram for describing the concept of a primary channel and a secondary channel.

In 802.11ac, the concept of a primary channel and a secondary channel as illustrated in FIG. 5 has been introduced in order to provide a broadband channel In general, the primary channel refers to a channel carrying a frame in its unique bandwidth, and the secondary channel refers to a channel used to extend a channel bandwidth along with the primary channel In an exemplary system of FIG. 5, a 20-MHz primary channel #60 may be used to transmit a frame in a 20-MHz channel If a 40-MHz frame is transmitted in a 40-MHz primary channel, both channels #60 and #64 should be idle in FIG. 5.

A relationship between primary channels and secondary channels may be summarized in the following [Table 1].

TABLE 1

| Channel bandwidth | Primary channel | Secondary channel | Total number of 20 MHz channels |
|---|---|---|---|
| 20 MHz | 60 | 64 | One (60) |
| 40 MHz | 60 | 52 | Two (60, 64) |
| 80 MHz | 52 | 36 | Four (52, 56, 60, and 64) |
| 160 MHz | 36 | n/a | Eight (36, 40, 44, 48, 52, 56, 60, and 64) |

FIG. 5 illustrates an exemplary channel configuration that may support up to 9 20-MHz channels.

Figure 6:
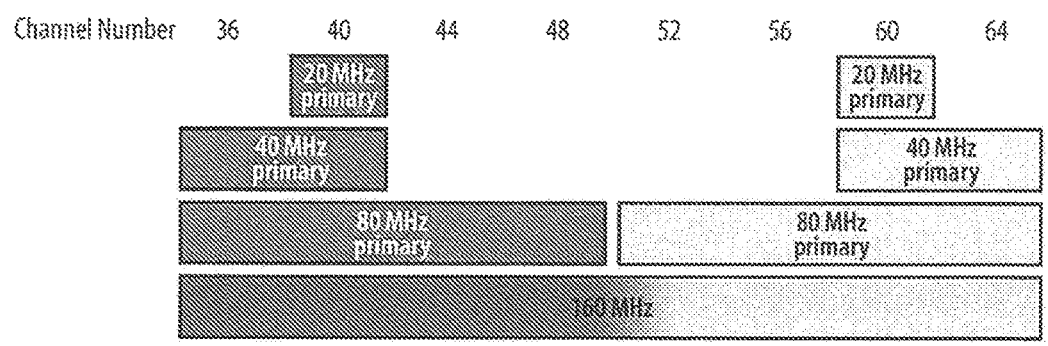
FIG. 6 is a diagram for describing a method for enabling co-existence of networks in the same frequency area, using the concept of a primary channel and a secondary channel.

FIG. 6 is a diagram for describing a method for enabling co-existence of networks in the same frequency area, using the concept of a primary channel and a secondary channel.

The reason for introducing the concept of a primary channel and a secondary channel as described above with reference to FIG. 5 is to facilitate a plurality of networks to share the same frequency area, as illustrated in FIG. 6. Even though a network is designed to support a maximum rate using a channel of up to 160 MHz due to demands for various types of devices and data rates, it does not always the maximum capacity of a corresponding channel.

Therefore, if primary channels do not overlap with each other, it is efficient to design channels so that the same frequency band may be shared. In FIG. 6, two networks having different primary channels co-exist in each bandwidth, by way of example.

Figure 7:
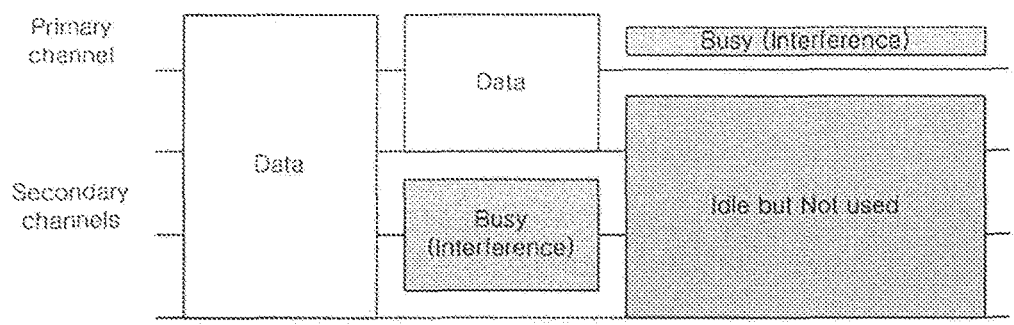
FIG. 7 is a diagram for describing a problem encountered with application of a Clear Channel Assessment (CCA) procedure and a Network Allocation Vector (NAV) setting only to a primary channel

FIG. 7 is a diagram for describing a problem encountered with application of a CCA procedure and a NAV setting only to a primary channel.

As described before, a broadband channel (e.g., a 40, 80, or 160-MHz channel) includes a primary channel and one or more secondary channels, and a NAV setting and a backoff procedure are performed only for a primary channel, for the afore-described co-existence of networks.

If a NAV setting and a backoff procedure are performed only for a primary channel as described above, it is favorable for network coexistence as illustrated in FIG. 6. However, if the primary channel is busy as illustrated in FIG. 7, although an idle secondary channel exists, the idle secondary channel is not used. That is, as illustrated in FIG. 7, in the case where the primary channel is bust, even though there is no network co-existing on the secondary channel, the idle secondary channel is not used for transmission.

This problem may reduce the efficiency of resource use. Particularly in a high-density WLAN environment in which APs using various bandwidths and channels are deployed in an overlapped manner, the problem may reduce resource efficiency.

Accordingly, an embodiment of the present invention proposes that a CCA procedure should be performed on each of a primary channel and a secondary channel, which will be described with reference to an exemplary drawing.

Figure 8:
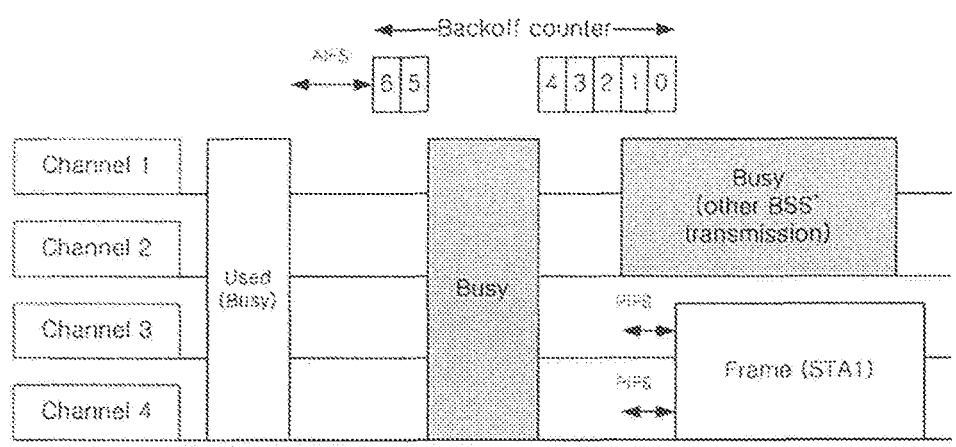
FIG. 8 is a diagram for describing a method for transmitting a frame on a plurality of channels according to an embodiment of the present invention.

FIG. 8 is a diagram for describing a method for transmitting a frame on a plurality of channels according to an embodiment of the present invention.

In the embodiment, a CCA procedure may be performed for a secondary channel as well as for a primary channel, as described above. Upon generation of a frame to be transmitted, an STA may perform the CCA procedure for each channel.

In the absence of an idle channel or in the presence of a PPDU transmission within its BSS, the STA may continue CCA until it detects an idle channel If there is one or more idle channels and there is no PPDU transmission within its BSS, the STA may start a backoff procedure or resume a discontinued backoff procedure.

In the illustrated case of FIG. 8, if all of channel 1 to channel 4 transition from a busy state to an idle state, a backoff procedure starts with a backoff timer value set to 6 after an AIFS. If channel 1 to channel 4 switch to the busy state, the on-going backoff procedure is discontinued. If the channels become idle again, the discontinued backoff procedure may be resumed.

Meanwhile, if the backoff count reaches 0 and there is no BSS PPDU for the STA, the STA may transmit a frame on the idle channels during a PIFS before the backoff count reaches 0. If the discontinued backoff procedure is resumed and the backoff count is 0 in the example of FIG. 8, even though a PPDU of another BSS is on a primary channel, a frame is transmitted to STA1 on a secondary channel A method for determining whether a PPDU is from a BSS of an STA or another BSS in the foregoing embodiment will be described below.

First, it may be determined from a HE PLCP header (e.g., HE SIG) of an STA whether a corresponding PPDU is from a BSS of the STA. For example, for an uplink from the STA to an AP (e.g., UL indication=1 or Group ID=0), the determination may be made by checking whether an ID is mapped to the PBSSID of the BSS of the STA. For a downlink from the AP to the STA (e.g. UL indication=0 or Group ID=63), the determination may be made by checking whether the value of a COLOR field is equal to the value of a COLOR field of the BSS of the STA. In another method, when a MAC PDU is decoded, it may be determined whether the corresponding PPDU is a PPDU from the BSS of the STA by checking whether address information of a MAC header matches the BSSID of the STA.

After checking the above, the PHY may indicate to the MAC layer whether the corresponding PPDU is a PPDU from the BSS of the STA by (1) a PHY-CCA.indication (Busy, channel-list, BSS info), a PHY-RXSTART.indication, a PHY-RXEND.indication, a PHY-DATA.indication, or the like, or (2) My BSS Info(0)=my BSS or My BSS Info(1)=other BSS.

If the PHY may not indicate to the MAC layer whether the corresponding PPDU is a PPDU from the BSS of the STA (e.g., if a preamble cannot be detected but energy is detected, if an HE-SIG CRC error occurs, or if the PPDU is a non-HE/HT PPDU), it is preferable to set BSS information to my BSS.

Meanwhile, an embodiment of the present invention proposes that a NAV is set or updated for all channels (including a primary channel and a secondary channel, and thus an STA is configured not to use a channel with a NAV set to a non-zero value.

The PHY may generate a PHY-RXSTART.indication for a non-HT PPDU that does not overlap with a primary 20-MHz channel The PHY may include a channel list value in a PHY-RXSTART.indication (RXVECTOR) primitive issued by the MAC layer. For example, the channel list value may be Primary, Secondary, Secondary 40, or Secondary 80.

If the MAC layer receives the PHY-RXSTART.indication from the PHY or successfully decodes an A-MPDU, a NAV may be set or updated for each channel accordingly.

Figure 9:
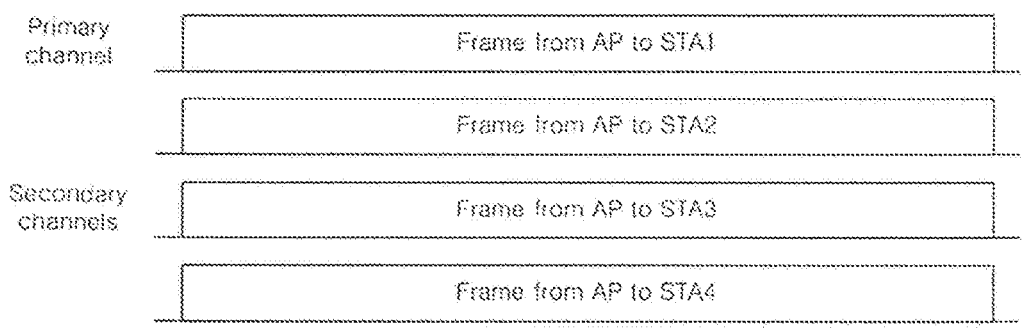
FIGS. 9 and 10 are diagrams for describing a method for transmitting a frame on a plurality of channels according to an embodiment of the present invention.
Figure 10:
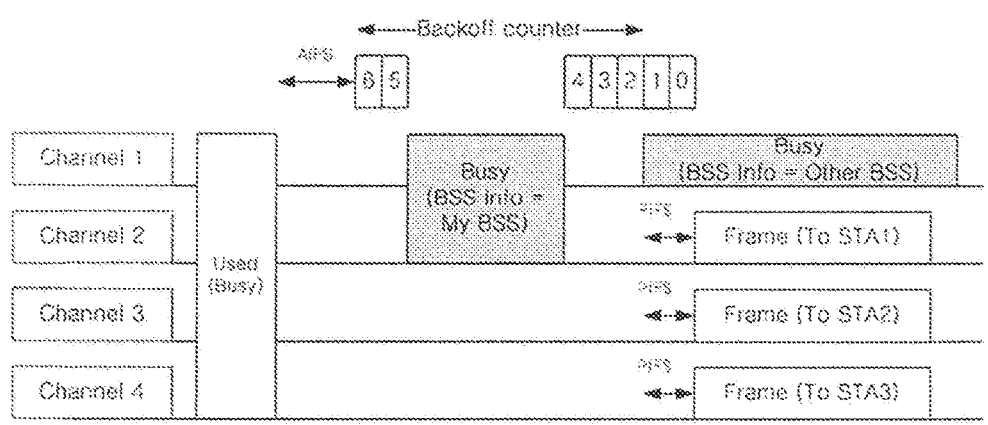

FIGS. 9 and 10 are diagrams for describing a case in which a multi-user access scheme is applied according to an embodiment of the present invention.

As illustrated in FIG. 9, an AP may transmit frames to a plurality of STAs on respective different idle channels in DL PI-DMA. In consideration of this, even though a primary channel is busy due to a PPDU of another BSS, a frame may be transmitted on a plurality of secondary channels, and frames are transmitted to the plurality of STAs on different secondary channels in FIG. 10.

While a DL MU access scheme directed from an AP to an STA has been described in FIGS. 9 and 10, by way of example, this scheme may be used as a UL MU access scheme directed from an STA to an AP.

Figure 11:
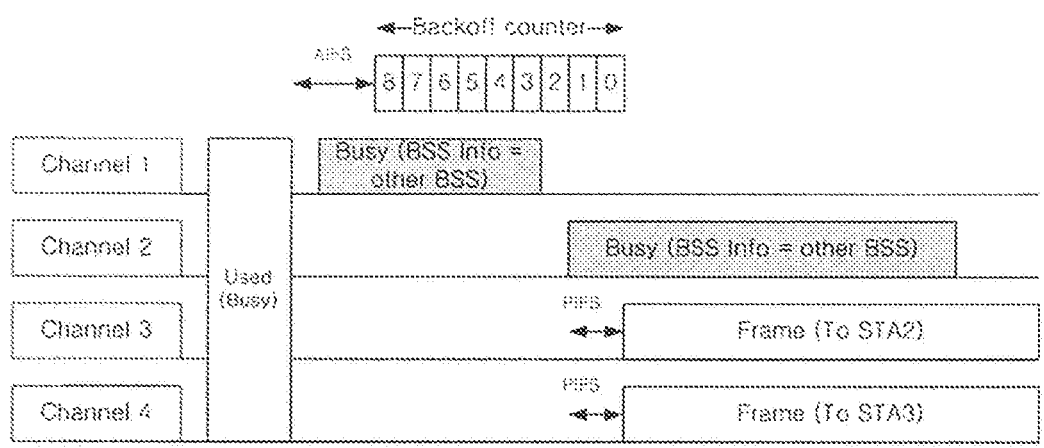
FIG. 11 is a diagram for describing processing of a busy channel during a backoff procedure according to an embodiment of the present invention.

FIG. 11 is a diagram for describing processing of a busy channel during a backoff procedure according to an embodiment of the present invention.

As illustrated in FIG. 11, a preferred embodiment of the present invention proposes that a backoff procedure is performed by performing CCA for each channel, and even though a backoff count reaches 0 for a channel detected as busy, a frame is not transmitted on the channel Since a channel that becomes busy during the backoff procedure has not been subjected to the backoff procedure, it has a higher collision risk.

Figure 12:
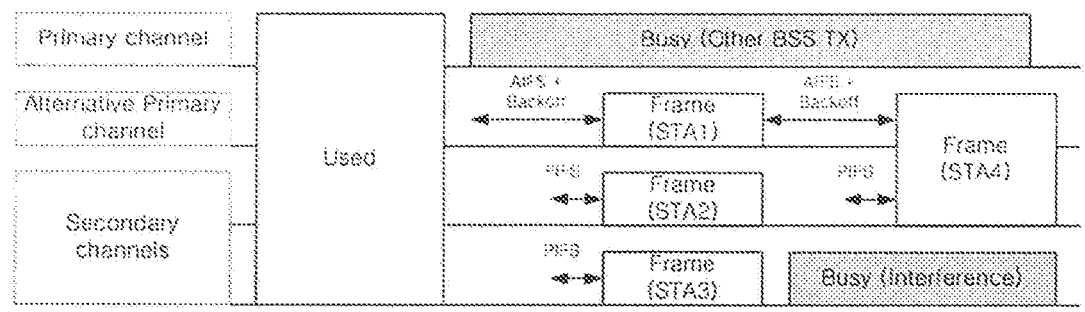
FIG. 12 is a diagram for describing a method for configuring a replacement primary channel according to another embodiment of the present invention.

FIG. 12 is a diagram for describing a method for configuring a replacement primary channel according to another embodiment of the present invention.

In the embodiment, a primary channel/secondary channel structure used in a legacy system may still be maintained. Meanwhile, the embodiment proposes that an AP transmits information about a replacement primary channel to STAs by a beacon/probe response message.

If a primary channel is busy and a transmission of another BSS is performed on the primary channel, a backoff procedure may be performed on a replacement primary channel, and the replacement primary channel may be used for transmission. In this case, related EDCA parameters (i.e., a backoff timer and a CW) may be stored and copied for the backoff procedure of the replacement primary channel The backoff procedure may restart on the replacement primary channel through the copied EDCA parameters.

If the backoff count reaches 0, the AP/STA may transmit a frame on idle channels during a PIFS. If transmission is failed on the replacement primary channel (e.g., if an ACK/NACK is not received), the backoff procedure may restart on the primary channel with a stored CW[AC] and a backoff timer value.

If the primary channel is busy due to a transmission of my BSS, the backoff procedure is preferably discontinued.

Now, a detailed description will be given of a method for setting a NAV for every secondary channel according to an embodiment of the present invention.

Figure 13:
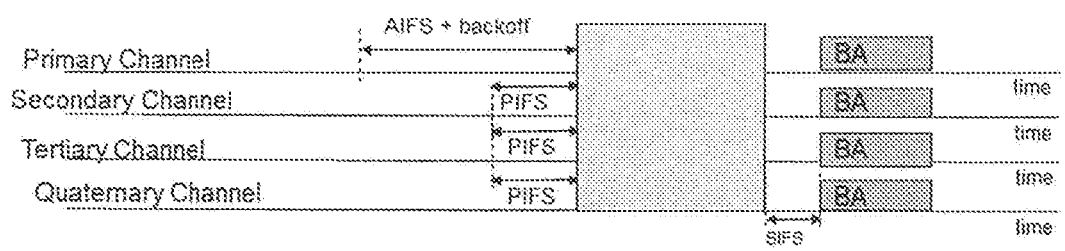
FIG. 13 is a diagram for describing a PCF Inter-Frame Space (PIFS) medium access method in a legacy system.

FIG. 13 is a diagram for describing a PIFS medium access scheme in a legacy system.

A broadband channel (e.g., a 40, 80, or 160-MHz channel) is configured to include a primary channel and a secondary channel, as described before. In the legacy system, a NAV and a backoff procedure are adjusted only for a primary channel, as described before. Although CCA is also performed for a secondary channel in the legacy system, in the case where when a backoff count reaches 0, a medium is idle for a PIFS, a corresponding secondary channel may be regarded as available and used for transmission.

Even though an STA receives a CTS frame not directed to the STA on a secondary channel, the STA does not set a NAV for the secondary channel. That is, the PHY does not issue a PHY-RXSTART.indication for a PPDU that does not overlap with a primary 20-MHz channel.

Figure 14:
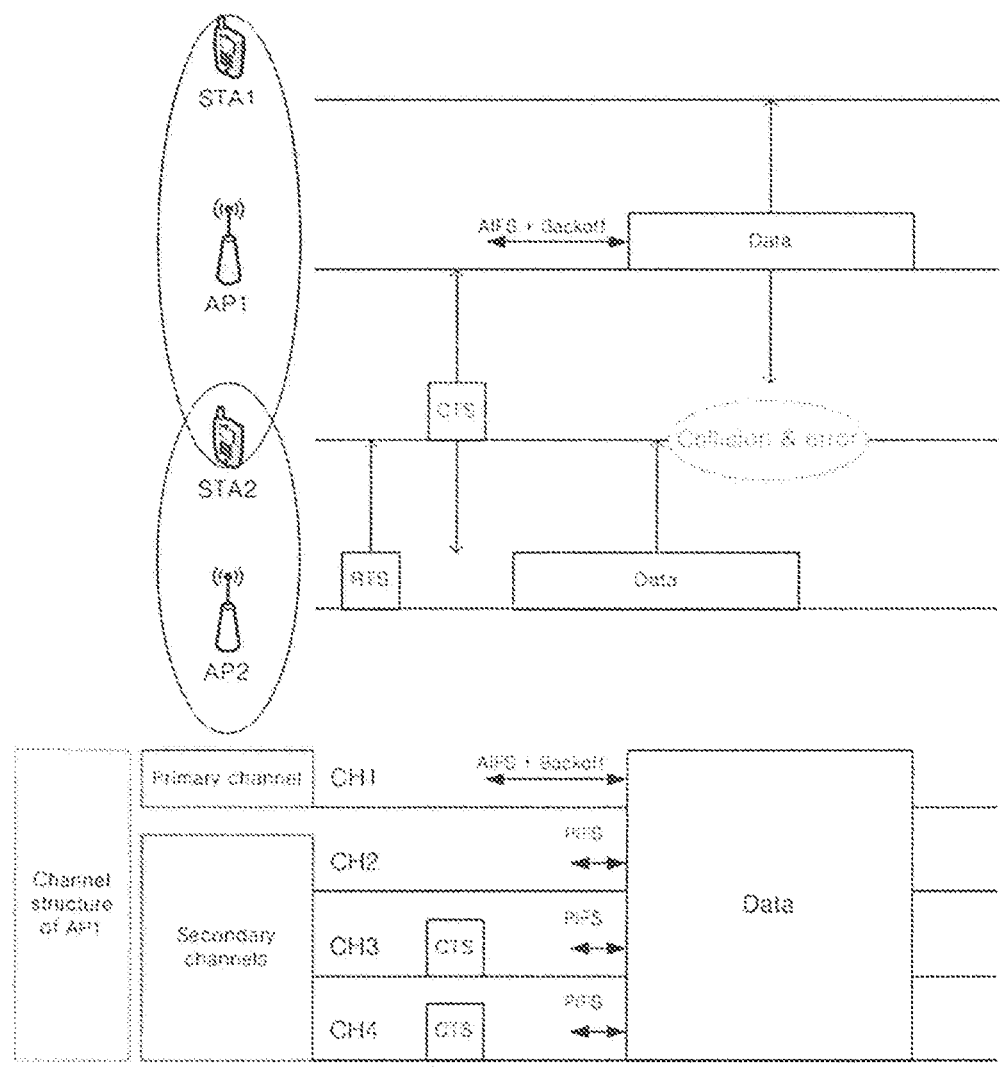
FIG. 14 is a diagram for describing a problem encountered with setting of a NAV only for a primary channel

FIG. 14 is a diagram for describing a problem encountered with setting of a NAV only for a primary channel.

If the PIFS medium access scheme is used in relation to FIG. 13, it may affect transmission of an STA in some cases. For example, it is assumed that STA1 is connected to AP1 and STA2 is connected to AP2 in FIG. 14. It is assumed that STA2 and AP1 can listen to signals from each other. Further, it is assumed that AP1 and STA1 use channels CH1, CH2, CH3, and CH4, and the channel CH1 is a primary channel It is also assumed that AP2 and STA2 use channels CH3 and CH4, and the channel CH3 is a primary channel In this situation, AP2 may transmit an RTS frame to STA2, and STA2 may respond to AP2 by transmitting a CTS frame. As illustrated in FIG. 14, the CTS frame may be received at AP1 on the channels CH3 and CH4.

If a NAV is set only for a primary channel as in the legacy system, since the channels CH3 and CH4 are idle during a PIFS, AP1 may also transmit a frame on the channels CH3 and CH4 in the above case. This transmission may cause a transmission error to STA2.

Figure 15:
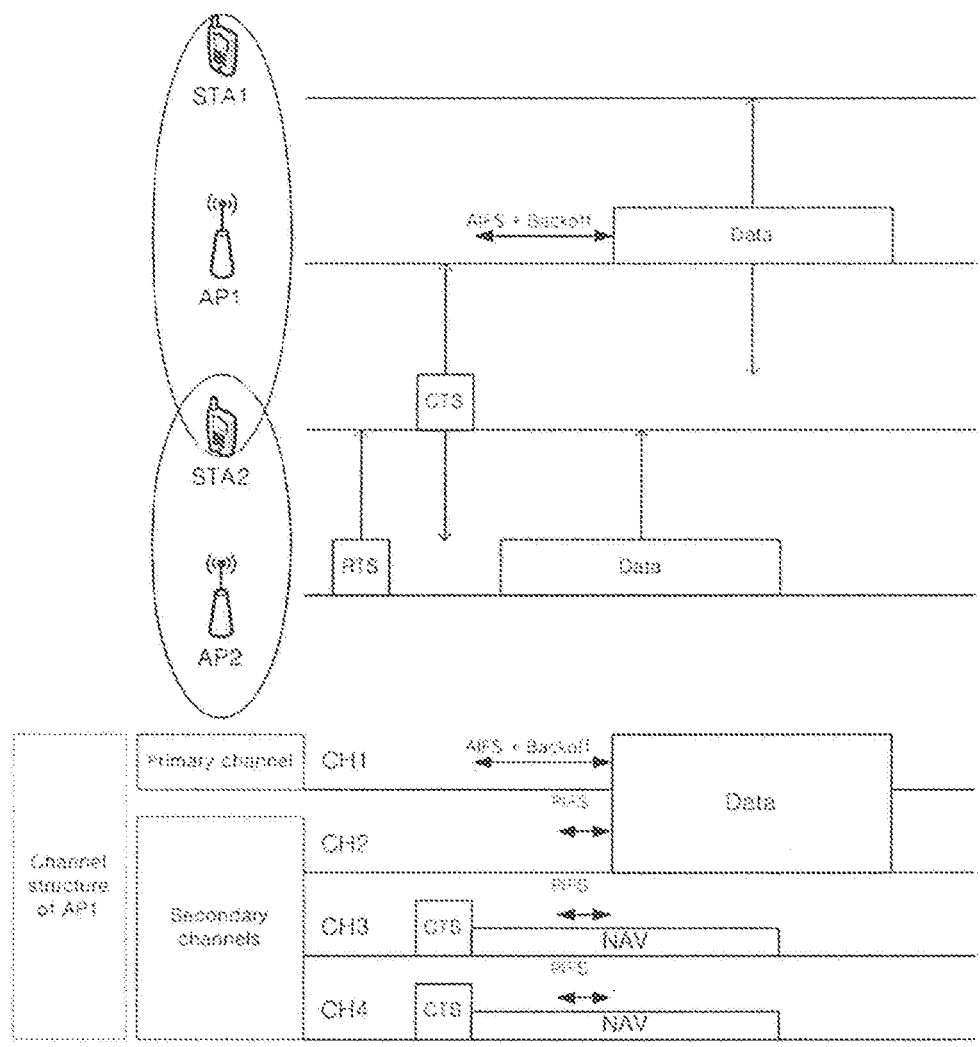
FIG. 15 is a diagram for describing a case in which a NAV is also set for a secondary channel according to an embodiment of the present invention.

FIG. 15 is a diagram for describing a case in which a NAV is also set for a secondary channel according to an embodiment of the present invention.

To solve the above-described problem, the embodiment proposes that if an STA succeeds in decoding a MAC PDU, the STA sets a NAV for every secondary channel and updates each NAV based on a received MPDU. For this purpose, the MAC layer may issue a PHY-RXSTART.indication primitive in response to reception of a short non-HT PPDU on a channel that does not overlap with a primary 20-MHz channel. The short non-HT PPDU may have a size equal to or smaller than a CTS frame size and may be calculated by an L_SIG field. The PHY may include a channel list value in the PHY-RXSTART.indication (RXVECTOR) primitive issued by the MAC layer, and the channel list value may be Primary, Secondary, Secondary 40, or Secondary 80.

The MAC layer may receive the PHY-RXSTART.indication primitive from the PHY. If an A-MPDU/MPDUs are successfully decoded, the MAC layer may set or update a NAV for each secondary channel.

According to the embodiment, even though when a backoff count reaches 0, a channel is idle for a PIFS, an STA may be configured not to transmit a frame on a channel with a NAV set to a non-zero value.

In FIG. 15, AP1 does not transmit data on the secondary channels CH3 and CH4 through a NAV set according to reception of a CTS frame from STA2, thereby preventing the problem described with reference to FIG. 14.

Figure 16:
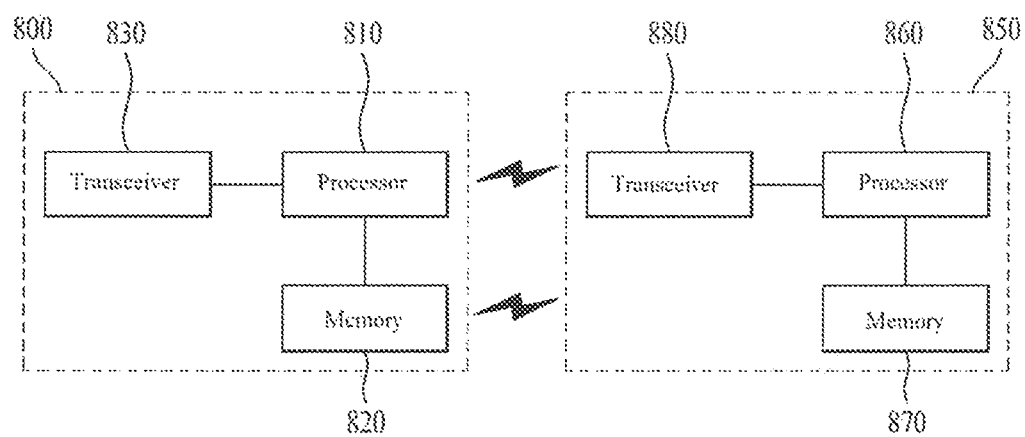
FIG. 16 is a block diagram of an apparatus for implementing the methods according to the present invention.

FIG. 16 is a block diagram of an apparatus for implementing the above-described methods.

In FIG. 16, a wireless device 800 may correspond to a specific STA described above and a wireless device 850 may correspond to an AP described above.

The STA 800 may include a processor 810, a memory 820, and a transceiver 830 and the AP 850 may include a processor 860, a memory 870, and a transceiver 860. The transceivers 830 and 880 may transmit/receive a wireless signal and may be implemented in a physical layer of IEEE 802.11/3GPP. The processors 810 and 860 are implemented in a PHY and/or a MAC layer and are connected to the transceivers 830 and 880. The processors 810 and 860 may perform the above-described UL MU scheduling procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an embodiment is performed by software, the above-described method may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the present invention has been described above in the context of an IEEE 802.11 WLAN system, the present invention is not limited thereto. The present invention is applicable in the same manner to various wireless systems that need to conduct communication on a broadband channel using a plurality of channels.

The invention claimed is:

1. A method for transmitting a frame using a plurality of channels including a primary channel and a secondary channel by a station (STA) in a wireless local area network (WLAN) system, the method comprising:
performing clear channel assessment (CCA) for each of the plurality of channels;
if at least one channel of the plurality of channels is not in use for frame transmission within a basic service set (BSS) of the STA, proceeding or resuming a backoff procedure for the at least one channel; and
transmitting the frame on the at least one channel, when a backoff count reaches 0 in the backoff procedure,
wherein, if a frame is received on the secondary channel that does not overlap with the primary channel, a physical layer entity of the STA issues a reception vector (RXVECTOR) primitive to a medium access control (MAC) layer entity, and the RXVECTOR primitive includes a channel list listing all of the plurality of channels.

2. The method according to claim 1, wherein the at least one channel for which the backoff procedure is proceeded or resumed includes the primary channel and the secondary channel.

3. The method according to claim 1, wherein if a frame is received on the primary channel or the secondary channel among the plurality of channels, a network allocation vector (NAV) is set or updated for each of the primary channel or the secondary channel.

4. The method according to claim 1, wherein if the primary channel among the plurality of channels is used for frame transmission of another BSS, the backoff procedure is proceeded or resumed for at least one secondary channel among the plurality of channels.

5. The method according to claim 1, wherein the physical layer entity of the STA determines whether transmission of a frame is frame transmission within the BSS of the STA by checking a HE SIG field of the frame.

6. The method according to claim 5, wherein if the physical layer entity of the STA is not capable of determining whether the transmission of the frame is frame transmission within the BSS of the STA by checking the HE SIG field of the frame, the frame transmission is considered to be frame transmission within the BSS of the STA.

7. The method according to claim 1, wherein a channel, which had been used for frame transmission during a first period of the backoff procedure among the plurality of channels, is configured not to be used for frame transmission performed during a second period of the backoff procedure.

8. The method according to claim 1, wherein the STA is an access point (AP) STA or a non-AP STA.

9. A station (STA) configured to transmit a frame using a plurality of channels including a primary channel and a secondary channel in a wireless local area network (WLAN) system, the STA comprising:
a processor configured to perform clear channel assessment (CCA) for each of the plurality of channels, and if at least one channel of the plurality of channels is not in use for frame transmission within a basic service set (BSS) of the STA, to proceed or resume a backoff procedure for the at least one channel; and
a transceiver connected to the processor and configured to transmit the frame on the at least one channel, when a backoff count reaches 0 in the backoff procedure,
wherein the processor includes a physical layer entity and a medium access control (MAC) layer entity, and if a frame is received on the secondary channel that does not overlap with the primary channel, the physical layer entity of the STA issues a reception vector (RXVECTOR) primitive to the MAC layer entity, and the RXVECTOR primitive includes a channel list listing all of the plurality of channels.

10. The STA according to claim 9, wherein the physical layer entity of the STA determines whether transmission of a frame is frame transmission within the BSS of the STA by checking a HE SIG field of the frame.

11. The STA according to claim 9, wherein the STA is an access point (AP) STA or a non-AP STA.

* * * * *